Nov. 3, 1925.  
H. H. STOUT  
1,559,803  
TREATMENT OF METALLURGICAL SLAG  
Filed Nov. 25, 1921
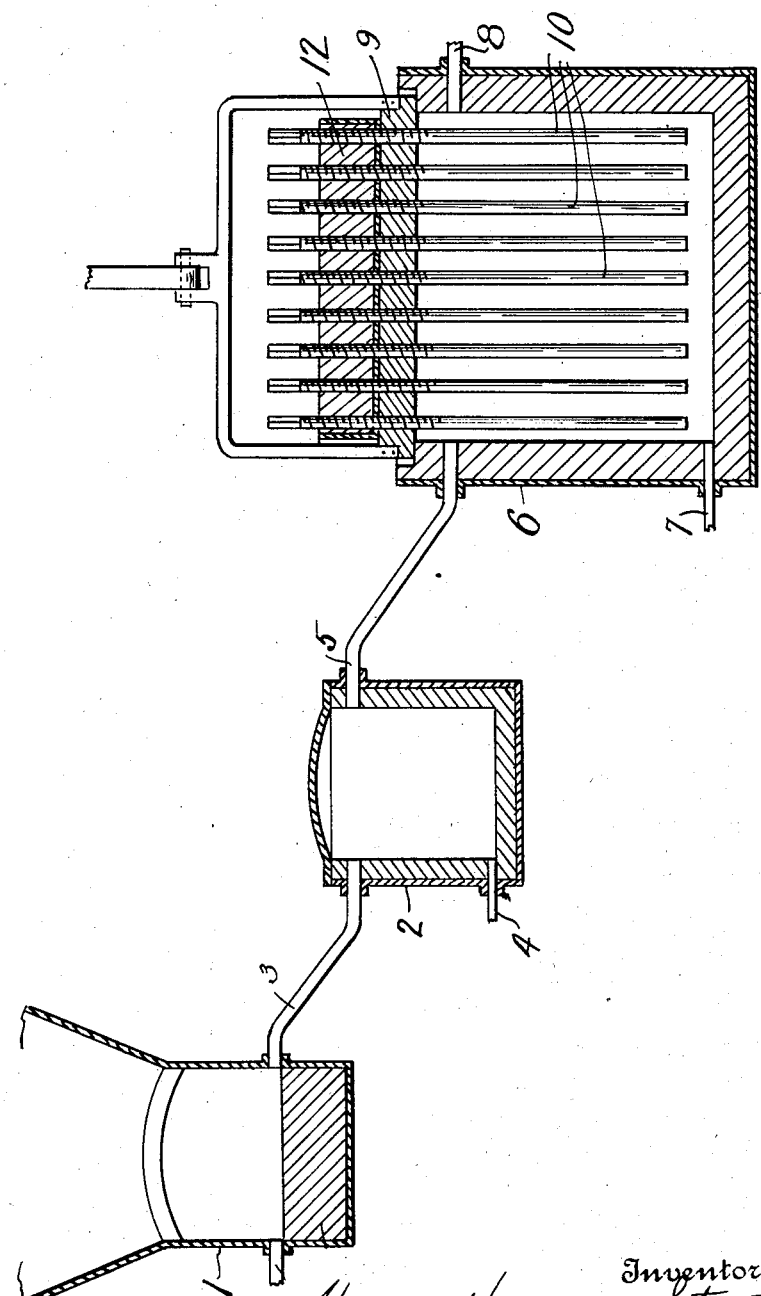

Patented Nov. 3, 1925.

1,559,803

UNITED STATES PATENT OFFICE.

HARRY HOWARD STOUT, OF DOUGLAS, ARIZONA.

TREATMENT OF METALLURGICAL SLAG.

Application filed November 25, 1921. Serial No. 517,449.

*To all whom it may concern:*

Be it known that I, HARRY HOWARD STOUT, a citizen of the United States, residing at Douglas, in the county of Cochise and State of Arizona, have invented certain new and useful Improvements in Treatment of Metallurgical Slag, of which the following is a specification.

This invention relates to a method of treating molten metallurgical slags in order to recover therefrom certain values in the form of associated or contained metallic ingredients. The method involves bringing the slag into contact with a material which re-acts with the slag to precipitate metallic values therefrom, and one of the objects of the invention is to provide for the employment of a precipitant which will be used up in the operation of cleaning the slag only to the extent that it combines with certain of the slag ingredients in the precipitation of the metallic values of the latter.

This I may accomplish by bringing the molten slag into contact with a precipitating material which does not become molten upon contact with the slag, but which makes the necessary combination with certain of the slag ingredients to precipitate the metallic values of the slag.

More specifically stated, it is an object of the invention to clean metallurgical slags by the use of unmolten precipitating materials, materials which maintain or are maintained in their unmolten condition during the cleaning operation, and are used up only to the extent necessary in causing precipitation of the metallic values of the slag as above suggested.

The invention accordingly attains the desirable objects, among others, of providing a slag-cleaning process in which there is the minimum using up or wasting of precipitating material, and in which fuel cost and other operating expenses are low. Incidentally, and considering certain aspects of the invention, it makes possible the use of a precipitating material which is economical and particularly effective, in that it produces large recoveries.

Other objects and aims of the invention, more or less broad than those stated above, together with the advantages inherent, will be in part obvious and in part specifically referred to in the course of the following description of the elements, combinations, and applications of principles constituting the invention; and the scope of protection contemplated will appear from the claims.

In the accompanying drawings, in which I have illustrated apparatus adapted for carrying out the process, I have shown in a more or less conventional and diagrammatic way, a blast furnace, a usual settler and a slag-cleaning settler, with the proper connections between them.

Referring to the numerals on the drawings, there is shown at 1 a smelting furnace in which the smelter slag is produced, and 2 indicates a usual settler fed from the furnace by means of a conduit 3 and having a matte tap 4 and a slag overflow 5 which leads into a slag-cleaning settler 6. This slag-cleaning settler has a tap 7 for the recovered metallic values and a final slag overflow 8. Preferably the slag-containing settler 6 (and also the settler 2) will be provided with the usual insulation to minimize heat loss; and the slag-cleaning settler 6 is covered by a cover 9, from and through which depend into the cleaning settler 6 a plurality of bars 10 of metal or other material having the characteristics hereinafter mentioned. The cover may be given a slow and very limited reciprocating movement transversely of the line of flow of the slag through the settler, by any suitable means, not shown.

The bars 10 are adjustably held in the cover 9, for purposes of adjustment or replacement, and preferably their outer ends beyond the cover are surrounded by a body of insulation 12, but with the ends of the bars exposed so that heat may be conducted through the bars and radiated to atmosphere.

Assuming an installation as above described to be used in connection with the treatment of copper metallurgical slags, I have found it advisable to make the bars 10 of wrought iron or steel having a melting point above the temperature of the slag, with the result that the contact between the slag and the iron bars is followed by a reaction between the exposed surface of the iron and certain ingredients of the slag whereby copper content of the slag is precipitated. Since the temperature of the iron bars is higher than the melting point of copper, the precipitated copper will not adhere to the iron bars, but will fall to the bottom of the settler whence it may be drawn off through the tap 7. I have found that there is no waste of the iron, but only so much of it is utilized as is necessary for the purposes of chemical reaction that results in the liberation of copper from the slag compounds or mixtures. In some cases it may be desirable to use as the material of the bars, metallic iron having a melting point lower than the slag temperature, and under such circumstances the iron bars may be maintained in an unmolten condition during the slag-cleaning process by regulating the insulation thereof and or the radiation therethrough, so that the bars may be kept in an unmolten state notwithstanding the differential between the melting point of the bars and the slag temperature.

I consider that the reactions and the consequent precipitation of copper are expedited by causing movement of the iron bars within and relatively to the body of slag, because thereby larger contact surfaces between iron and slag are made possible per unit of time, and substantially all parts of the slag body may be subjected to the cleaning action of the iron bars. While the relative movement between bars and slag is probably preferable, I do not wish to be limited to any particular kind of relative motion; and in fact the invention may be practiced without anything more than a simple bringing into contact of the slag with non-molten iron bars. Thus I might cause the slag to flow into a receptacle containing stationary iron bars, or to flow down a trough over stationary bodies of iron.

It will also be appreciated that while I have described my invention as applied particularly to the recovery of values from copper metallurgical slags, the field of its application is not limited to the treatment of any particular slag, and that therefore any statements of materials employed are to be taken as illustrative merely, and not in a limiting sense. If the process be used in connection with the metallurgy of other metals, the character of the non-molten precipitating material may of course be changed, mutatis mutandis; and other materials than metallic iron may be used even in the treatment of copper slags.

I claim:

The process of removing metal values from molten metallurgical slag, which comprises bringing the whole body of a charge of molten slag into contact with a non-molten material which reacts with ingredients of the molten slag to precipitate said metallic values therefrom and the uncombined residuum of which is persistently non-molten throughout the precipitating reaction, the slag-charge temperature remaining unincreased during its contact with the said non-molten material, and the initial quantity of the non-molten material being greater than what is necessary to accomplish the desired precipitation, and positively moving the non-molten material within and relatively to the body of slag.

In testimony whereof I affix my signature.

HARRY HOWARD STOUT.